3,104,412
WINDSHIELD CLEANERS
Gordon H. A. Hinder, Hamilton, Ontario, Canada, assignor to Hamilton Clamp & Stamping Limited, Hamilton, Ontario, Canada
Filed Aug. 23, 1960, Ser. No. 51,357
2 Claims. (Cl. 15—250.42)

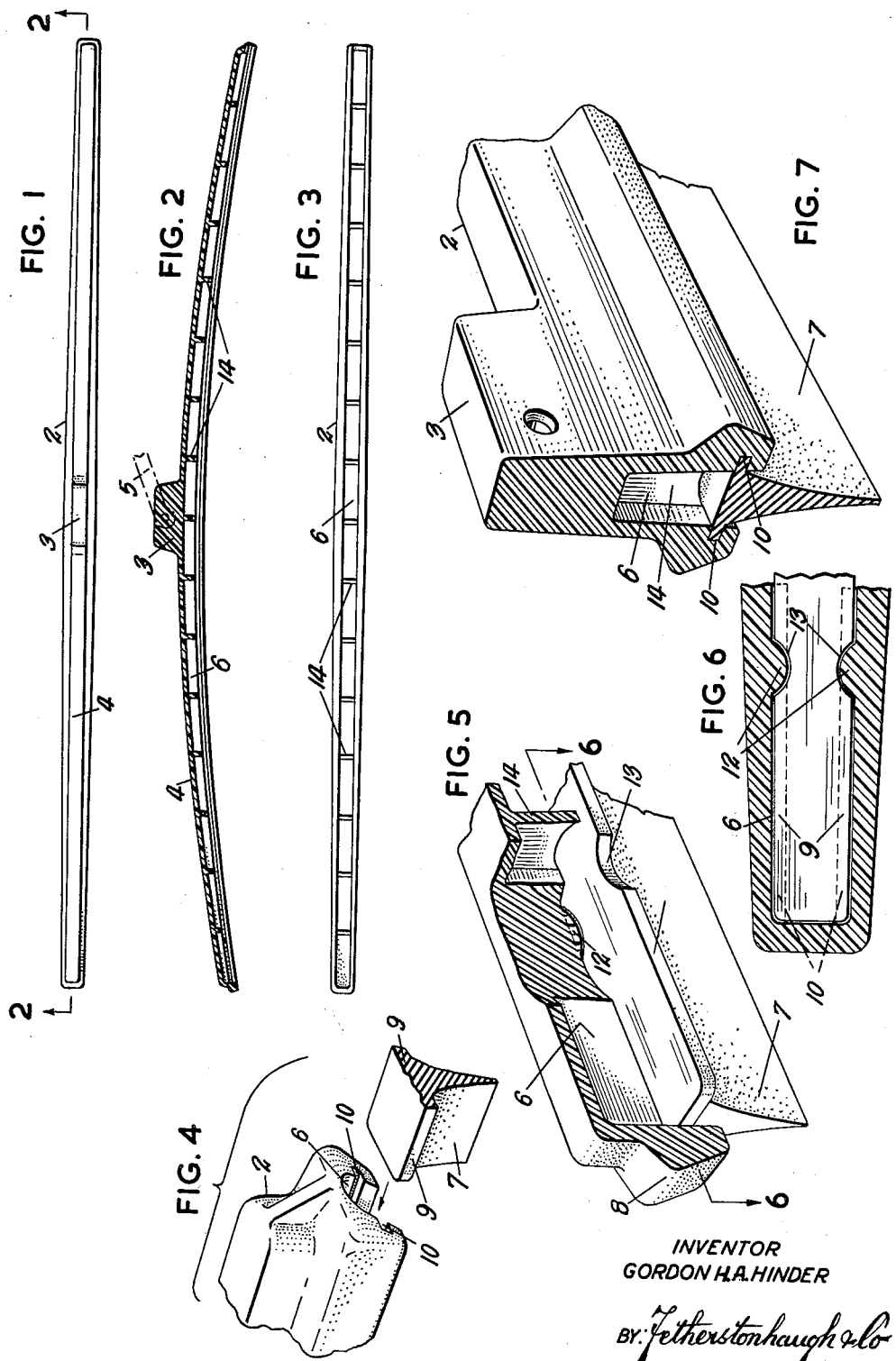

This invention relates to improvements in windshield cleaners or wiper devices and is particularly directed to a wiper blade assembly for cleaning a curved surface.

The use of curved windshields in modern automotive design has presented a difficult problem in providing a wiper blade assembly which will satisfactorily wipe, free of streaks, a curved windshield under all weather conditions. In an endeavor to meet this problem present day blade assemblies for use upon curved windshields consist of a plurality of hingedly connected metal link members upon which a resilient squeegee wiper element is carried, the linkage being provided to permit the wiper element to flex as it swings to-and-fro across a curved windshield surface; for this purpose the squeegee element supporting link members are pivotally connected thereto in spaced relationship along the element's length, the wiper blade assembly being carried upon the outer end of a conventional wiper arm which presses the wiper blade assembly against the curved windshield surface.

While wiper blade assemblies of the foregoing type are, to quite an extent, standard equipment upon present day automobiles they are not completely satisfactory in that the linkage cannot evenly press the wiper blade assembly against the curved windshield surface for the reason that the linkage pressure is only exerted against the flexible wiper element at several spaced apart points and which results in streaking in light shower conditions or if the squeegee blade of the element becomes even slightly worn. Furthermore, in winter conditions, ice and snow clog the linkage with the result that the linkage loses its freedom of movement and the wiper element ceases to flex. In an endeavour to overcome this deficiency a special winter wiper blade assembly is obtainable wherein the linkage is encased in a rubber jacket.

The object of this invention is to provide a wiper blade assembly in which squeegee element supporting linkage is eliminated, and in which the squeegee element is directly mounted upon a curved resilient member capable of exerting a balanced even pressure towards the face of the windshield; a particular object of the invention being to form the curved resilient member of moulded plastic material such as thermoplastic nylon resin which retains the desired flexing characteristics under great extremes of climatic conditions.

A further object of the invention is to provide a resilient member within which the squeegee wiper element is slidably contained and whereby the element may be readily withdrawn therefrom for the purpose of replacement.

With the foregoing and other objects in view, as shall appear, the invention consists of a windshield wiper blade assembly formed and arranged all as hereinafter more particularly described and illustrated in the accompanying drawing, in which:

FIG. 1 is a front view of the curved moulded resilient member within which the squeegee wiper element is mounted.

FIG. 2 is a longitudinal cross-sectional view taken through the line 2—2, FIG. 1.

FIG. 3 is a rear view of the moulded resilient member.

FIG. 4 is an enlarged fragmentary view of one end of the resilient member together with a portion of the squeegee wiper element before its insertion into the resilient member.

FIG. 5 is an enlarged broken away fragmentary perspective view of the other end of the resilient member and showing the squeegee wiper element contained therein, and FIG. 6 is a horizontal cross-sectional view through the end portion of the resilient member and taken through the line 6—6, FIG. 5.

FIG. 7 is an enlarged fragmentary perspective view of the central portion of the assembled resilient member and squeegee wiper element.

The windshield cleaning blade assembly only comprises two integral inherently flexible parts which when in engagement constitute the complete assembly, one part being the flexible surface wiping squeegee and the other the flexible resilient backing member formed of moulded resilient plastic material, such as thermoplastic nylon resin manufactured by Du Pont and sold under the trade name "Zytel."

The backing member 2, as shown in entirety in FIGS. 1, 2 and 3 is moulded in a curvature substantially equivalent to the maximum curvature of the windshield surface to be wiped and is preferably formed with an integral lug 3 positioned centrally of the convex wall 4 of the member and to which the usual spring urged windshield wiper arm 5 is pivotally attached.

The member 2 is formed with a squeegee receiving channel 6 which opens inwardly from its concave face and extends from end to end thereof, a squeegee wiper blade 7 being insertable into the channel at one end of the member 2, as shown in FIG. 4, and retained against excess inward movement by a lip 8 formed upon the other end of the member, as shown in FIG. 5.

The squeegee wiper blade 7 is formed with a pair of flanges 9 extending from either side thereof and which are slidably received within a pair of grooves 10 formed within the side walls of the channel and extending along its length and spaced inwardly of the outer edges of the sidewalls.

For the purpose of retaining the squeegee wiper member in position against accidental displacement within the member 2 a plurality of integral semi-circular tongues 12 are formed within the grooves and which are arranged to enter corresponding recesses 13 within the side edges of the squeegee flanges 9 when the wiper blade is fully inserted into the member 2. As both the unitary member 2 and the unitary squeegee wiper blade 7 are moulded of resilient material the tongues 12, which in practice are relatively small, present no problem in insertion or withdrawal of the wiper blade.

To retain the cleaning blade assembly against the possibility of excessive lateral flexing or bending when encountering conditions, such as heavy snow, a plurality of lateral webs 14, bridging the groove 6, are moulded in the member 2. The webs also have a function in giving the member 2 sufficient body to resiliently retain its moulded curved shape.

From the foregoing description it will be apparent that a unique windshield wiping means is provided wherein metal parts such as linkage have been eliminated, and although a preferred embodiment of the invention has been described, it is obvious that various modifications of the invention may be made without departing from the spirit of the invention as set forth in the appended claims.

What I claim as my invention is:

1. A windshield cleaner for cleaning a curved surface and comprising a replaceable squeegee unit substantially flexible throughout its length and conformable to a surface being wiped and a permanent resilient backing member having a concave face and a windshield wiper arm attaching part, said member being formed of plastic material and being of a curvature substantially equivalent to the maximum curvature of the windshield surface to be wiped and containing a channel following the curvature of the backing member and extending lengthwise of its concave face, said channel having a pair of opposed side walls, each side wall having an unbroken face extending from end to end of the member, the squeegee unit being slidably insertable lengthwise into the channel between its side walls to extend along the entire length of the channel, and wherein the channel is of greater depth than the depth of the portion of the squeegee unit contained therein, and a plurality of flexible integral strengthening webs arranged in spaced apart relation and bridging the inner portion of the channel inwardly of the squeegee unit.

2. A windshield cleaner for cleaning a curved surface and comprising a replaceable squeegee unit substantially flexible throughout its length and conformable to a surface being wiped and a permanent resilient backing member having a concave face and a windshield wiper arm attaching part, said member being formed of plastic material and being of a curvature substantially equivalent to the maximum curvature of the windshield surface to be wiped and containing a channel following the curvature of the backing member and extending lengthwise of its concave face, said channel having a pair of opposed side walls, each side wall having an unbroken face extending from end to end of the member, the squeegee unit being slidably insertable lengthwise into the channel between its side walls to extend along the entire length of the channel, a pair of oppositely positioned grooves formed in the side walls of the channel and extending along their lengths, the portion of the squeegee unit contained within the channel being formed with a pair of flanges extending from either side thereof and slidably contained within the grooves, the channel being of greater depth than the depth of the portion of the squeegee unit contained therein, and a plurality of flexible integral strengthening webs arranged in spaced apart relation and bridging the inner portion of the channel inwardly of the squeegee unit, and wherein the flanges of the squeegee unit are resilient and the flanges and the grooves in the channel formed with engaging tongues and recesses which retain the squeegee unit in position within the backing member.

References Cited in the file of this patent

UNITED STATES PATENTS

| | | |
|---|---|---|
| 2,583,710 | Scinta | Jan. 29, 1952 |
| 2,700,785 | Oishei et al. | Feb. 1, 1955 |
| 2,706,305 | Oishei | Apr. 19, 1955 |
| 2,782,449 | Anderson | Feb. 26, 1957 |

FOREIGN PATENTS

| | | |
|---|---|---|
| 985,180 | France | Mar. 7, 1951 |
| 1,124,116 | France | June 25, 1956 |